United States Patent [19]
Shimoyama et al.

[11] Patent Number: 5,355,164
[45] Date of Patent: Oct. 11, 1994

[54] METHOD AND APPARATUS OF CORRECTION IMAGE READ SIGNALS BY REMOVING THE INFLUENCE OF DARK CURRENT THEREFROM

[75] Inventors: Yuji Shimoyama; Yoko Takada, both of Kaisei, Japan

[73] Assignee: Fuji Photo Film Co., Ltd., Kanagawa, Japan

[21] Appl. No.: 902,740

[22] Filed: Jun. 23, 1992

Related U.S. Application Data

[63] Continuation-in-part of Ser. No. 718,468, Jun. 20, 1991, abandoned.

[30] Foreign Application Priority Data

Jun. 25, 1990 [JP] Japan ................... 2-166098

[51] Int. Cl.$^5$ ............................................. H04N 5/335
[52] U.S. Cl. ................................................... 348/243
[58] Field of Search .................. 358/213.15, 213.16, 358/213.18, 213.24, 213.27, 221, 177, 463, 465, 466; 348/241, 243, 248, 249, 294; H04N 5/335

[56] References Cited

U.S. PATENT DOCUMENTS 4,293,877 10/1981 Tsunekawa et al. ............. 358/213.16
4,558,366 12/1985 Nagumo ........................ 358/213.15
5,132,801 7/1992 Yamano ......................... 358/213.16
5,153,421 10/1992 Tandon et al. .................. 358/213.16

FOREIGN PATENT DOCUMENTS 53-123617 10/1978 Japan .............................. H04N 1/40
60-180377 9/1985 Japan .............................. H04N 1/40
2179069 7/1990 Japan .............................. H04N 1/40

Primary Examiner—Michael T. Razavi
Assistant Examiner—Tuan V. Ho
Attorney, Agent, or Firm—Sughrue, Mion, Zinn, Macpeak & Seas

[57] ABSTRACT

A method of correcting image read signals including the steps of reading an image line by line by a linear sensor; determining an average value when a plurality of lines of a plurality of blind pixels of the linear sensor are read, computing the signals read from the image by using the average value so as to correct an influence of a dark current of said linear sensor, and outputting said computed signal as the image read signal. According to the present invention, the dark current can be accurately obtained according to the read state without being affected by errors in measurement due to the variations in each of the one-line pixels or due to noise.

4 Claims, 5 Drawing Sheets

METHOD AND APPARATUS OF CORRECTION IMAGE READ SIGNALS BY REMOVING THE INFLUENCE OF DARK CURRENT THEREFROM

CROSS-REFERENCE TO RELATED APPLICATION

This application is a continuation-in-part of our prior application Ser. No. 718,468, filed on Jun. 20, 1991, entitled "METHOD OF CORRECTION FOR IMAGE READ SIGNALS" and now abandoned.

BACKGROUND OF THE INVENTION

1. Field of the Invention

The present invention relates to a method of correcting image signals read from an image in a case where an image is optically read by a linear sensor composed of CODs (Charge Coupled Devices) or the like and to an apparatus therefor.

2. Description of the Related Art

The method used for correcting dark current of a solid-state image pick-up device, until the present time, is described in Japanese Patent Laid-open No. 123617/1978. In this method, a light source is turned off to obtain the dark current and the value thereof is stored in a memory. Thereafter, the light source is turned on. The stored value of the dark current is subtracted from a signal at the time the image is actually read, and this is assumed to be a corrected image signal read from the image. In this method, however, there is a problem in turning the light source on and off. Another problem occurs when the value of the dark current is changed by variations in the surrounding environment such as temperature. This is due to the fact that once the value of the dark current is stored, it becomes the point of reference for future corrections regardless of the variations, thereby precluding accurate corrections.

In a correcting method described in Japanese Patent Laid-open No. 180377/1985, a dark current is represented by data of one dummy pixel. This dark current value is subtracted from an image signal made from an image and it is assumed to be a signal read from the image. In this method, however, since the dark current value is obtained by using one pixel, there are drawbacks in that a variation in each pixel and errors in measurement due to noise cannot be handled completely and therefore an accurate correction of the dark current cannot be performed.

As described above, since the variations in the photoelectric characteristics of the conventional solid-state image pick-up device are great at the dark time level, an accurate correction is not performed. In this regard, the linear sensor, in particular, has a drawback in that a streak appears running in the direction of the auxiliary scanning.

FIG. 1 shows an example of an apparatus (Japanese Patent Laid-open No. 333839/1988) which solves the above-mentioned problems. Signals read by a linear sensor 1 are converted to digital signals RS (e.g., 8 bits) and output by an A/D converter 3 through an amplifier 2. The digital signals RS are then input to an adder 4 and a subtracter 7. An addition signal AS (e.g., 11 bits) in the adder 4 is input to a latch circuit 5. Eight (8) bits of them are added in synchronization with a pixel clock PC shown in FIG. 2 from a timing generating circuit 8. This addition result LS (e.g., 11 bits) is input to a latch circuit 6 at a subsequent stage. Each of the latch circuits 5 and 6 is cleared by a shift pulse LSP. The latch circuit 6 sets the addition result LS of the latch circuit 5 in the latch circuit 6 in accordance with the addition result set pulse SP shown in FIG. 2 and inputs the average value of addition data, i.e., an 8-bit signal ALS, is input to the subtracter 7.

In this embodiment, the status of the pixels of the linear sensor 1 is as shown in FIG. 3. If eight pixels are read from the beginning of a line by the latch circuit 5, the output data of several pixels of blind pixels BC can be read and added, and an average value ALS of the 8 pixels of the blind pixels BC is output each time one line is scanned. Therefore, in a case where an image is read by the linear sensor 1 using the read pixels RP, the read signal is input to the subtracter 7 through the A/D converter 3. The average value ALS is subtracted from the read signal RS so that the dark current is corrected. This corrected signal is output as a signal PR read from the image.

In the above-described method, however, when errors in measurement occur due to noise, they are erroneously recognized as streaks running in the auxiliary scanning direction.

SUMMARY OF THE INVENTION

The present invention has been devised in light of the above-mentioned circumstances. An object of the present invention is to provide a method for correcting signals read from an image which is capable of accurately determining a dark current value by means of an average value of a plurality of blind pixels each time a plurality of lines are read by a linear sensor; and performing an accurate correction on line-by-line image signals on the basis of several lines before and after the object line each time a correction is performed.

Another object of the present invention is to provide apparatus in which the above method is realized.

According to one aspect of the present invention, for achieving the objects described above, there is provided a method of correction for image read signals, comprising the steps of: reading an image line by line by a linear sensor; determining an average value when a plurality of lines of a plurality of blind pixels of said linear sensor are read; computing a signal read from the image by using said average value so as to correct an influence of a dark current of said linear sensor; and outputting said computed signal as the image read signal.

According to another aspect of the present invention, there is provided an apparatus of correction for image read signals which comprises: a linear sensor for reading an image line by line; an A/D converter for converting an output signal of said linear sensor into a digital signal; a shift register to input said digital signal and to output data of blind pixels of plural lines preceeding; line memories to input said digital signal for any one; a first subtracter for subtracting said data of blind pixels from current blind pixels output; an adder to input a subtraction value from said first subtracter; a first latch circuit for latching the addition data from the adder and for inputting an output thereof to the adder; a second latch circuit for retaining the addition data; a divider for dividing an output of said second latch circuit so as to obtain an average value; a second subtracter for subtracting the average value from the output of said respective line memories and to output a corrected signal; and a timing generating circuit for controlling said line memories, said shift register and said first and second latch circuits by timing signals.

Further, according to still another aspect of the present invention, there is provided an apparatus of correction for image read signals which comprises: a linear sensor for reading an image line by line; an A/D converter for converting an output signal of said linear sensor into a digital signal; a shift register to input said digital signal and to output data of blind pixels of plural lines preceeding; line memories to input said digital signal for any one; a first subtracter for subtracting said data of blind pixels from current blind pixels output; an adder to input a subtraction value from said first subtracter; a first latch circuit for latching the addition data from the adder and for inputting an output thereof to the adder; a second latch circuit for retaining the addition data and for obtaining an average value by throwing away lower-order bits; a second subtracter for subtracting the average value from the output of said respective line memories and to output a corrected signal; and a timing generating circuit for controlling said line memories, said shift register and said first and second latch circuits by timing signals.

These and other objects, features and advantages of the present invention will become clear when reference is made to the following description of the preferred embodiments of the present invention, together with reference to the accompanying drawings.

DESCRIPTION OF THE PREFERRED EMBODIMENT

Figure 3:
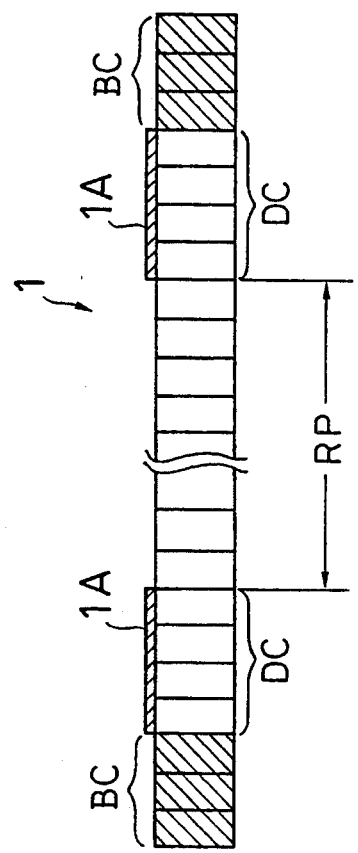
FIG. 3 is a view showing an example in which pixels of a line sensor are arrayed.

A linear sensor 1 composed of CCDs or the like has blind pixels BC which do not have a function for sensing several pixels (e.g., 15 bits) from both ends of the linear sensor 1, as shown in FIG. 3, and has an area of dummy pixels DC with a light blocking mask 1A of several pixels (e.g., 15 bits) provided on the surface of the linear sensor 1 towards the middle of the linear sensor 1. The other portion central thereto are the read pixels RP. Usually, an image is read by using the read pixels RP, and a signal read from the image is output.

Up until now, a dark current is measured by using the dummy pixels DC with the mask 1A provided on the surface of the linear sensor 1, and a read signal is corrected by using the dark current. In the present invention, signals of the blind pixels BC which are provided on both ends of the linear sensor 1, do not have a sensor function, and are used as dark current correcting signals; and the average value of the blind pixels of a plurality of lines are used. A signal made from an image from the read pixels RP is corrected by the average value data and output. The output of the blind pixels BC is a signal in a state in which light is completely shut off at an average value of a plurality of lines. Therefore, correction for image reading can be accurately performed, and no streak will occur in the auxiliary scanning direction at the time an image is reproduced.

Figure 5:
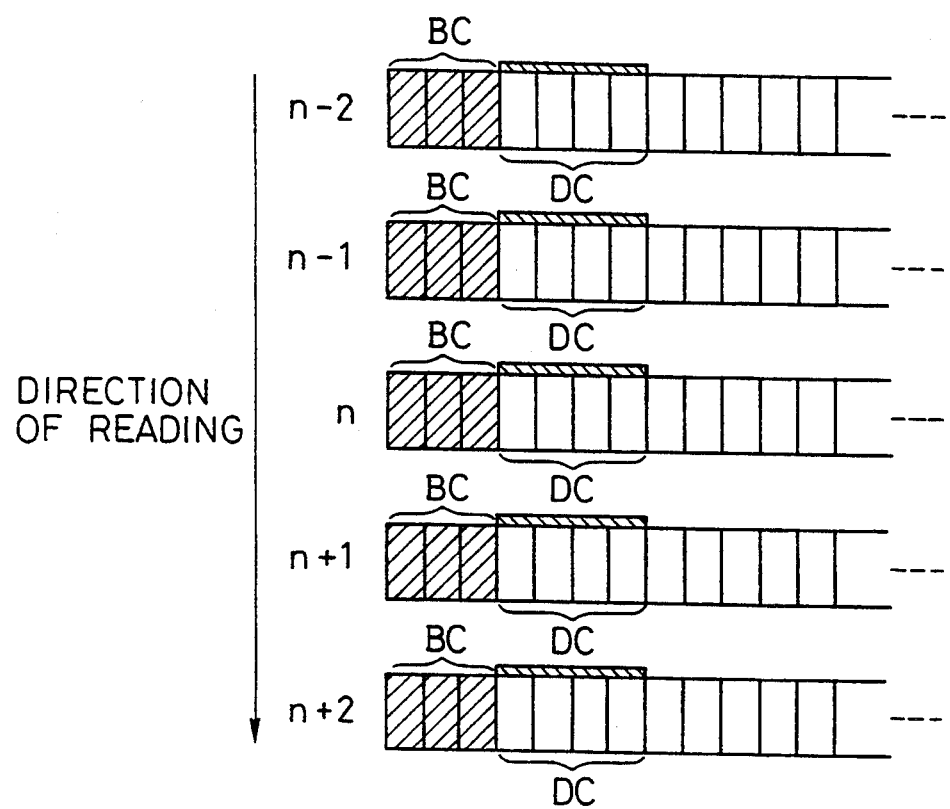
FIG. 5 is a view showing the principles of the present invention.

In the present invention, when a plurality of lines are read, an average value of a plurality of the blind pixels BC is determined. A signal read from the image is corrected by using the average value and output. For example, as shown in FIG. 5, for the output of the nth line, a signal read from the image is corrected by using the average value of the blind pixels BC of five lines, i.e., two lines before ($n-1$ and $n-2$) and two lines after ($n+1$ and $n+2$) the current line, and the current line ($n$).

Figure 1:
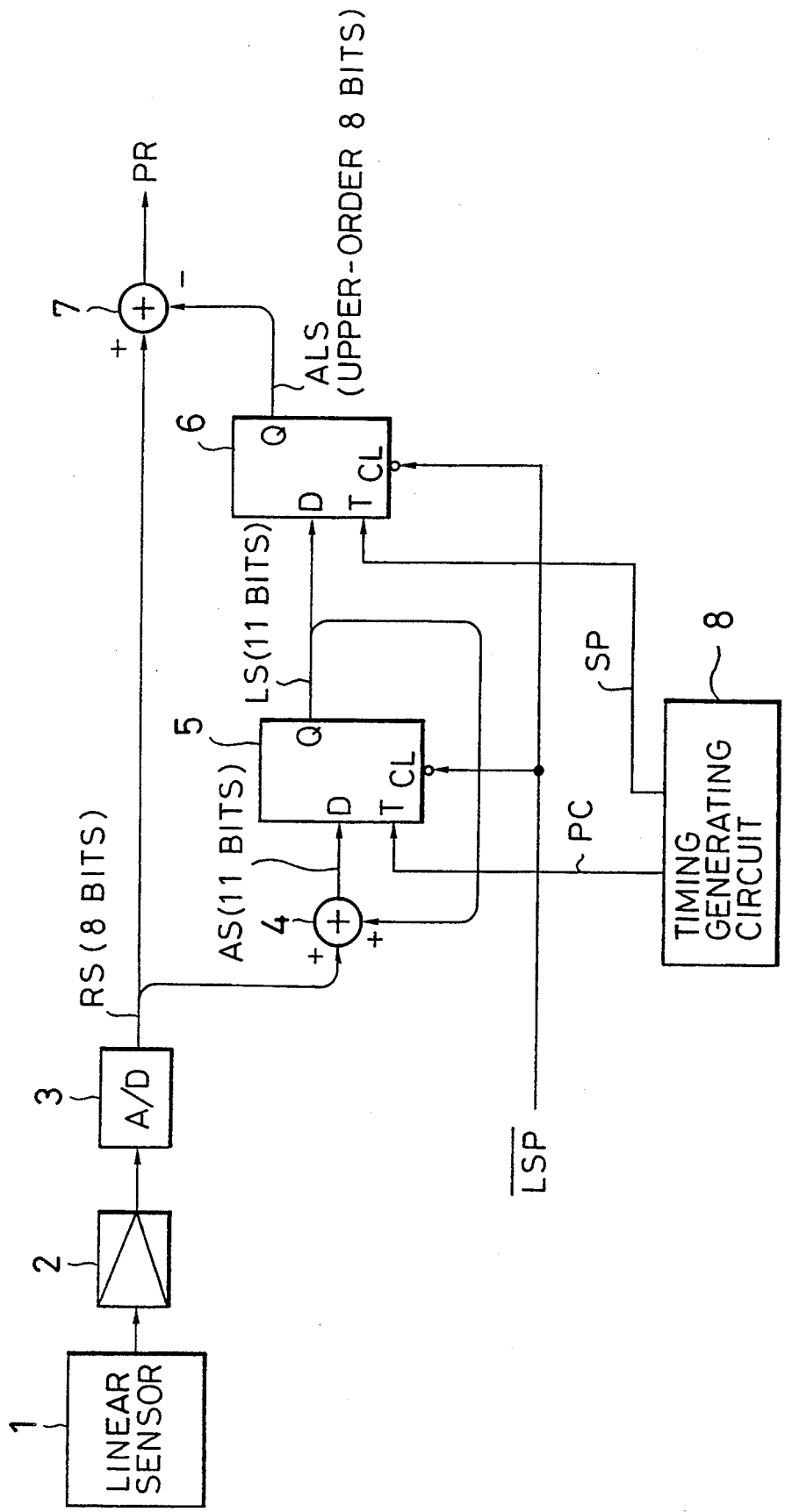
FIG. 1 is a block diagram showing an example of a general apparatus in the prior art.
Figure 2:
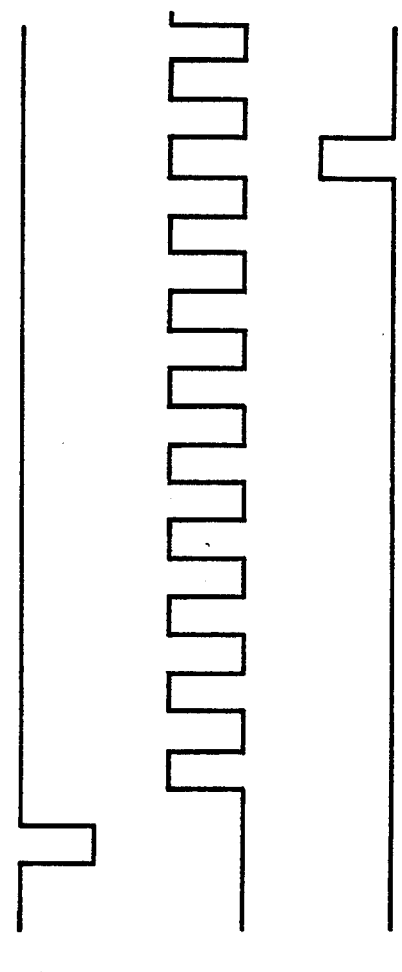
FIG. 2 is a timing chart showing an example of the operation of the apparatus.
Figure 4:
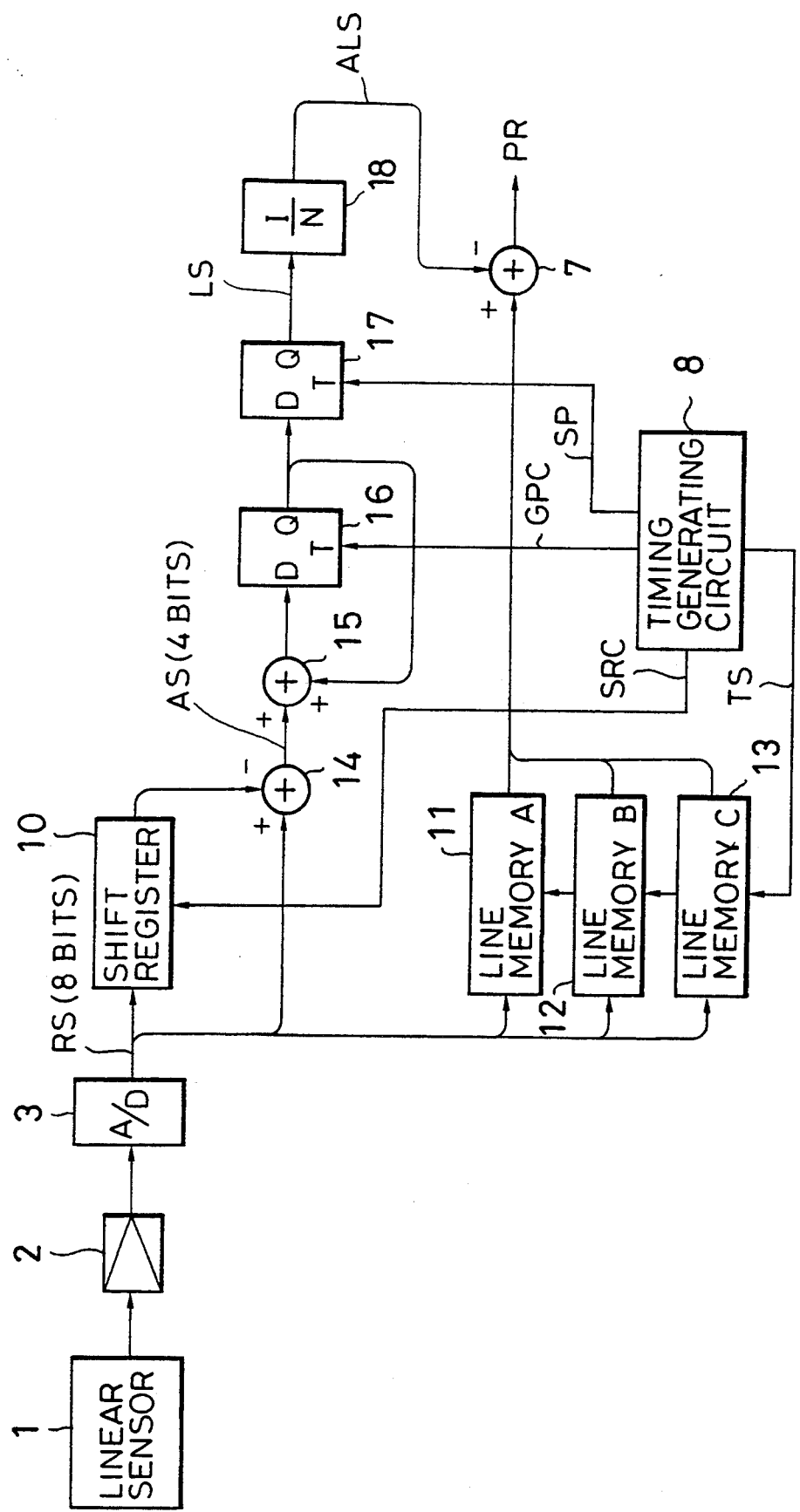
FIG. 4 is a block diagram showing an example of an apparatus according to the present invention.

FIG. 4 shows an embodiment of an apparatus of the present invention in which the above method is realized, which an improvement over that in FIG. 1. This embodiment shows a case in which an average value of five lines, each line consisting of 8 pixels, is used. A digital signal RS (8 bits) output from the A/D converter 3 is input to a shift register (40 steps) 10 and to any one of line memories 11 to 13 in synchronization with the timing signal TS. Data of the blind pixels BC of the five lines preceeding is output from the shift register 10 by a timing signal SRC from a timing generating circuit 8, and it is subtracted from the current blind pixel output RS by means of a subtracter 14. A subtraction value is input to an adder 15 with an output of a latch circuit 16, and an addition signal AS (4 bits) is input to the latch circuit 16. It is added by the latch circuit 16 by an integrating clock GPC from the timing generating circuit 8 for the blind pixels BC. The addition data LS is retained in the next-stage latch circuit 17 by a timing signal SP from the timing generating circuit 8. An average value ALS is obtained by dividing the addition data LS with N (=40) at a divider 18. The average value ALS is subtracted from an image signal read out from the line memories 11 to 13 by means of the subtracter 7, and thus the output signal PB is corrected. As a result, correcting computation is performed by the average value ALS of the blind pixels BC of five lines before and after an object line, and no streak will occur in the auxiliary scanning direction. Data for the three lines are stored in the line memories 11 to 13, and the reading/writing of them is in turn controlled by the timing signal TS from the timing generating circuit 8.

Figure 6:
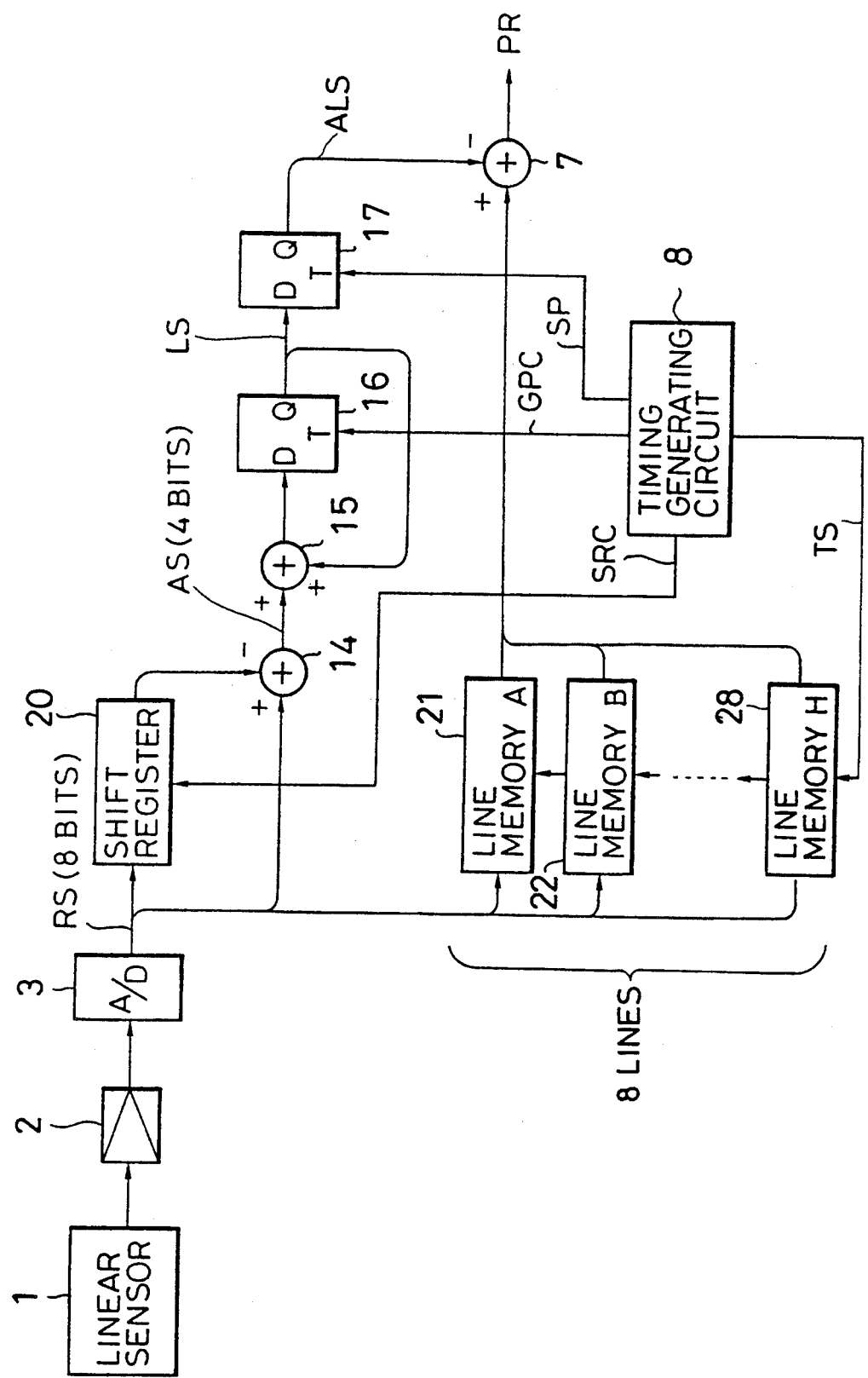
FIG. 6 is a block diagram showing another example of the apparatus of the present invention.

If the number of the blind pixels for the correction is exponential for "2", the divider could be deleted and the construction becomes more brief. FIG. 6 shows another embodiment of the present invention which uses the average value of sixteen lines, each line consisting of 8 pixels (total is 128 pixels). The digital signal RS (8 bits) output from the A/D converter 3 is input to a shift register (128 steps) 20 and to any one of line memories 21 to 28 in synchronization with the timing signal TS. Data of the blind pixels BC of the eight lines preceeding is output from the shift register 20 by the timing signal SRC from the timing generating circuit 8, and it is subtracted from the current blind pixel output RS by means of the subtracter 14. The subtraction value is input to the adder 15 and added to the output of the latch circuit 16, and the addition signal AS (4 bits) is input to the latch circuit 16. It is added by the latch circuit 16 by the integrating clock GPC from the timing generating circuit 8 for the blind pixels BC. The addition data LS is retained in the next-stage latch circuit 17 by the timing signal SP from the timing generating circuit 8, In this time, an average value ALS is obtained from the addition data LS by throwing away the lower-order 7 bits. The average value ALS is subtracted from an image signal read out from the line memories 21 to 28 by means of the subtracter 7, and thus the output signal PR is corrected. As a result, correcting computation is performed by the average value ALS of the blind pixels BC of sixteen lines before and after an object line, and no streak will occur in the auxiliary scanning direction. Data for the eight lines are stored in the line memories 21 to 28, and the reading/writing of them is in turn controlled by the timing signal TS from the timing generating circuit 8.

The number of pixels for determining the average value of the blind pixels can be any number. In the above description, a linear sensor 1 was cited as an example of a solid-state image pick-up device and explained. It can also basically be applied to an area sensor.

As has been explained above, according to the correcting method of the present invention, an average value of output signals of the blind pixels is determined from a plurality of lines for each line read by a linear sensor. Signals read from the line are corrected by the average value. Therefore, a dark current can be accurately obtained according to the read state without being affected by errors in measurement due to the variations in each of the one-line pixels or due to noise. The correcting method of the present invention can be used even when environment temperature varies. Thus, accurate correction is made possible. In addition, even in a case where measurement errors occur in the blind pixels output of a certain line due to noise, its influences are minimized and streaks can be prevented from occurring.

Many different embodiments of the present invention can be made without departing from the spirit and scope thereof; therefore, it is to be understood that the present invention is not limited to the specific embodiments described above and is solely defined in the appended claims.

What is claimed is:

1. An apparatus for correcting image read signals comprising:
    a linear sensor for reading an image line by line and outputting read pixel signals of said image and blind pixel signals;
    an A/D converter for converting an output signal of said linear sensor into a digital signal;
    a shift register, coupled to an output of said A/D converter for receiving said digital signal, for storing and outputting a plurality of blind pixel signals of a plurality of lines;
    line memories, coupled to said output of said A/D converter for storing said digital signal;
    a first subtracter for subtracting blind pixel signals from a plurality of preceding lines from blind pixel signals of a current line;
    an adder, having a first input coupled to an output of said first subtracter and a second input for outputting addition data;
    a first latch circuit for latching the addition data from the adder, and having an output coupled to said second input of the adder;
    a second latch circuit for storing the addition data;
    a divider for dividing an output of said second latch circuit so as to obtain an average value;
    a second subtracter for subtracting the average value from an output of at least one of said line memories, and for outputting a corrected signal; and
    a timing generating circuit for controlling said line memories, said shift register and said first and second latch circuits by timing signals.

2. An apparatus as claimed in claim 1, wherein said digital signal is 4 bits, the number of said line memories is three and a divisor of said divider is 40.

3. An apparatus for correcting image read signals comprising:
    a linear sensor for reading an image line by line and outputting read pixel signals of said image and blind pixel signals;
    an A/D converter for converting an output signal of said linear sensor into a digital signal;
    a shift register, coupled to an output of said A/D converter for receiving said digital signal, for storing and outputting a plurality of blind pixel signals of a plurality of lines;
    line memories, coupled to said output of said A/D converter, for storing said digital signal;
    a first subtracter for subtracting blind pixel signals from a plurality of preceding lines from blind pixels from a current line;
    an adder having a first input coupled to an output of said first subtracter and a second input for outputting addition data;
    a first latch circuit for latching the addition data from the adder, and having an output coupled to said second input of the adder;
    a second latch circuit for storing the addition data and for obtaining an average value by outputting a portion of said stored addition data;
    a second subtracter for subtracting the average value from the output of at least one of said line memories, and for outputting a corrected signal; and
    a timing generating circuit for controlling said line memories, said shift register and said first and second latch circuits by timing signals.

4. An apparatus as claimed in claim 3, wherein said digital signal is 4 bits and the number of said line memories is eight.

* * * * *